(12) United States Patent
Bai (10) Patent No.: US 7,573,629 B2
(45) Date of Patent: Aug. 11, 2009

(54) BLADE ACTUATING APPARATUS FOR OPTICAL INSTRUMENTS

(75) Inventor: Longji Bai, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 12/181,634

(22) Filed: Jul. 29, 2008

(65) Prior Publication Data

US 2009/0034046 A1 Feb. 5, 2009

(30) Foreign Application Priority Data

Jul. 30, 2007 (JP) .............................. 2007-197642

(51) Int. Cl.
*G02B 26/02* (2006.01)
(52) U.S. Cl. ...................... 359/230; 359/233; 359/234; 396/493
(58) Field of Classification Search ....................... None
See application file for complete search history.

(56) References Cited

U.S. PATENT DOCUMENTS 2,949,076 A * 8/1960 Finkl .......................... 396/510
6,340,252 B1 1/2002 Kawano

FOREIGN PATENT DOCUMENTS

| JP | 10-62835 | 3/1998 |
|---|---|---|
| JP | 2000-352737 | 12/2000 |
| JP | 2002-162665 | 6/2002 |

\* cited by examiner

*Primary Examiner*—James Phan
(74) *Attorney, Agent, or Firm*—Wenderoth, Lind & Ponack, L.L.P.

(57) ABSTRACT

A base plate is provided with four guide pins and a rotor has four output pins so that each of four blades is provided with a plurality of slots. Individual slots provided to the blades are selectively fitted to the four guide pins and the four output pins so that when the rotor is reciprocated and rotated, the blades are capable of continuously changing the size of an aperture by cooperation of their aperture forming edges while maintaining a regular octagon.

10 Claims, 6 Drawing Sheets

BLADE ACTUATING APPARATUS FOR OPTICAL INSTRUMENTS

BACKGROUND OF THE INVENTION

1. Field of the Invention

This invention relates to a blade actuating apparatus for optical instruments in which a plurality of blades are actuated so that the size of an optical path aperture is changed while maintaining a similar figure.

2. Description of Related Art

As blade actuating apparatuses for cameras, of blade actuating apparatuses for optical instruments, shutter apparatuses, stop apparatuses, filter apparatuses, and lens barrier apparatuses are known. As for blade actuating apparatuses for projectors, blade actuating apparatuses for microscopes, and blade actuating apparatuses for illumination instruments, stop apparatuses are known. In the shutter apparatuses or stop apparatuses, of these, particularly designed so that a plurality of blades are actuated at the same time and the size of the optical path aperture is changed, with the optical axis as a center, it is considered ideal that the size of the optical path aperture is changed while always maintaining the similar figure close to a circle. However, in order to force such actuation upon the plurality of blades, it is necessary to provide a ring member (a driving ring in the shutter apparatus or a stop ring in the stop apparatus) reciprocated and rotated, with the optical axis as a center, so that the blades are rotated in the same direction at the same time. Hence, this structure has the problem that a high cost is caused and has recently been adopted only in a high-grade instrument.

Thus, as alternatives to the structure, blade actuating apparatuses each designed so that the size of the optical path aperture is changed, with the optical axis as a center, by a plurality of blades without providing the ring member such as that mentioned above have been numerously proposed and used. Most of these apparatuses, however, are not able to satisfy both requirements that the size of the optical path aperture always maintains the similar figure and can be continuously changed. An example of such a structure is disclosed in Japanese Patent Kokai No. 2000-352737. A stop apparatus (a light-amount adjusting apparatus) disclosed here has a unique structure and is constructed so that two stop blades (moving blades) are actuated simultaneously in directions perpendicular to each other by a single electromagnetic actuator in a plane perpendicular to the optical axis and thereby the area of the optical path aperture is changed. The present invention relates to this type of blade actuating apparatus.

Kokai No. 2000-352737, as mentioned above, discloses the stop apparatus constructed so that the two stop blades are actuated simultaneously in directions perpendicular to each other in a plane perpendicular to the optical axis and thereby the area of the optical path aperture is changed. Since the optical path aperture is provided at a place where grooves configured on the two stop blades intersect, the optical path aperture provided in this way has the shape of a square. In Kokai No. 2000-352737, it is also disclosed that the stop blades are configured so that the widths of the grooves are changed gradually, and thereby optical path apertures of a plurality of squares of different sizes can be obtained. Hence, this stop apparatus is such that the optical path aperture of the similar figure with the optical axis as a center is obtained. However, the size of such an optical path aperture is governed by the width of the groove previously configured and thus the size other than that of the preset optical path aperture cannot be obtained. Consequently, such a structure cannot be adopted in a stop apparatus designed so that the optical path aperture is continuously controlled. In addition, this structure cannot be also adopted as the shutter apparatus.

SUMMARY OF THE INVENTION

It is, therefore, an object of the present invention to provide a blade actuating apparatus for optical instruments which can be adopted as the shutter apparatus and the stop apparatus as well, in which a plurality of blades actuated simultaneously in directions perpendicular to each other in a plane perpendicular to the optical axis are provided and these blades are constructed so that the size of the optical path aperture is continuously changed while always maintaining the similar figure, with the optical axis as a center.

In order to achieve the above object, the blade actuating apparatus for optical instruments according to the present invention comprises a base plate which has a circular optical path aperture to construct a blade chamber between the base plate and a cover plate and is provided with four guide pins at positions where segments connecting the four guide pins form a square on the blade chamber side surface of the base plate; an electromagnetic actuator which is provided with a rotor having a permanent magnet and is mounted to the base plate in such a way that the four guide pins provided between the rotary axis of the rotor and the center of the aperture are arranged, two on each side of a line connecting the rotary axis and the center as a symmetry axis, to make four output pins provided integrally with the rotor at preset angular intervals in radial directions to project into the blade chamber; a first blade and a second blade, each having an aperture forming edge, a first slot, and a second slot, so that in the first blade, the first slot provided parallel to the symmetry axis is fitted to two guide pins located on one side of the symmetry axis, while in the second blade, the first slot provided parallel to the symmetry axis is fitted to two guide pins located on a remaining side of the symmetry axis, and so that the second slot of the first blade and the second slot of the second blade are fitted to a first output pin and a second output pin, respectively, of the four output pins and thereby a reciprocating operation is performed parallel to the symmetry axis in directions opposite to each other by a reciprocating rotation of the rotor; and a third blade and a fourth blade, each having an aperture forming edge, a first slot, and a second slot, so that the first slot of each of the first blade and the second blade is fitted to one of the guide pins located on each side of the symmetry axis and so that the second slot of the third blade and the second slot of the fourth blade are fitted to a third output pin and a fourth output pin, respectively, of the four output pins and thereby the reciprocating operation is performed perpendicular to the symmetry axis and in directions opposite to each other by the reciprocating rotation of the rotor. The four blades are actuated by the rotation of the rotor so that the size of the optical path aperture is changed into a similar figure by cooperation of aperture forming edges of the four blades.

In this case, when the four output pins are provided at angular intervals of 90° with respect to the rotor so that the first output pin and the second output pin are provide at angular intervals of 180° and the third output pin and the fourth output pin are also provided at angular intervals of 180°, or when the second slot of the first blade and the second slot of the second blade are provided perpendicular to the symmetry axis and the second slot of the third blade and the second slot of the fourth blade are provided parallel to the symmetry axis, the design and fabrication of the apparatus are facilitated.

At least one of the first slot of the third blade and the first slot of the fourth blade may include two slots so that one of the two slots is fitted to one of the two guide pins located on one side of the symmetry axis and a remaining slot is fitted to one of the two guide pins located on the remaining side of the symmetry axis. When each of the aperture forming edges provided on the four blades includes two edge ends configured to open about 130° toward a blade actuated in an opposite direction so that the optical path aperture formed by the edge ends of the four blades is shaped into an octagon, the optical path aperture closest to a circle is obtained. Further, the electromagnetic actuator is a motor in which the rotor is reciprocated and rotated only within a preset angle in accordance with a direction in which the coil of a stator is energized, and when the stator is provided with a magnetic sensing detection element detecting a rotation angle position of the rotor, a small-sized and low-cost blade actuating apparatus for optical instruments which has a stop function is obtained.

The blade actuating apparatus for optical instruments according to the present invention is designed so that two sets of blades, two for each set, actuated in opposite directions in a plane perpendicular to the optical axis are provided and the two sets of blades are actuated simultaneously in directions perpendicular to each other by a single electromagnetic actuator having the four output pins. Hence, it becomes possible that these blades are actuated in such a way as to continuously change the shape of the optical path aperture while always maintaining the similar figure, with the optical axis as a center, by cooperation of the aperture forming edges of the four blades, and there is the feature that the shutter apparatus and stop apparatus having high functions are obtained.

These and other features and advantages of the present invention will become apparent from the following detailed description of the preferred embodiment when taken in conjunction with the accompanying drawings.

DETAILED DESCRIPTION OF THE PREFERRED EMBODIMENT

In accordance with the embodiment shown in the drawings, the present invention will be explained. The blade actuating apparatus for optical instruments can be used as a lens barrier apparatus for cameras or a stop apparatus for illumination instruments, but when it is used as a shutter apparatus or stop apparatus for cameras or as a stop apparatus for projectors or for microscopes, a particular effect is brought about. Of shutter apparatuses for cameras, a shutter apparatus designed so that a plurality of blades have a stop function as well is known, but the present invention can also be used as such a shutter apparatus. In addition, when the present invention is used as the shutter apparatus for cameras, the shutter apparatus can be adopted in a film camera as well as in a digital camera, while the present invention is used as the stop apparatus for cameras, the stop apparatus can be adopted in a movie camera as well as in a still camera. The embodiment is constructed as a stop apparatus for movie cameras designed so that a stop diameter is automatically changed in accordance with the brightness of an object. However, reference will be properly made to other cases as well.

Embodiment

Figure 1:
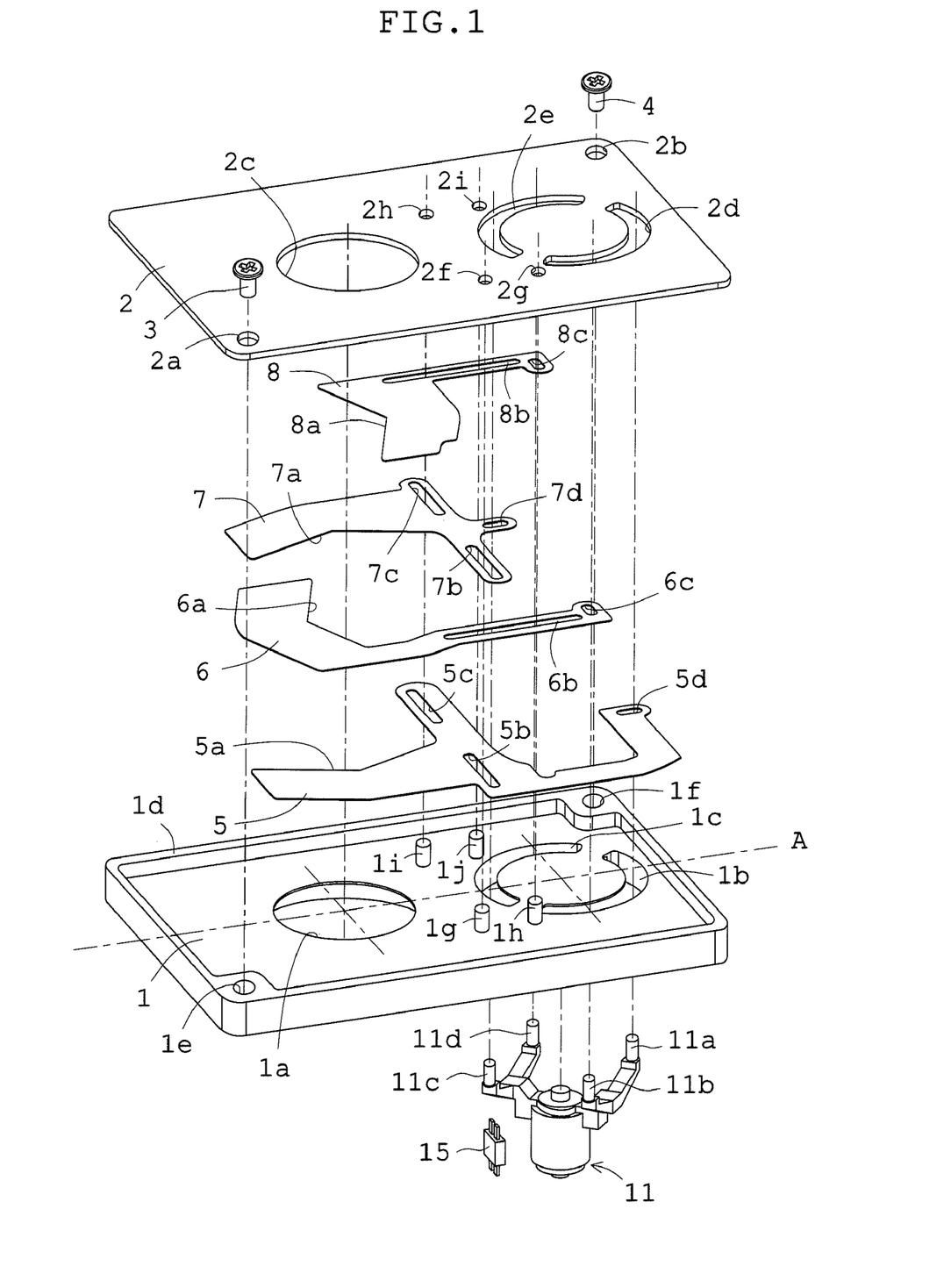
FIG. 1 is an exploded perspective view of the embodiment of the present invention shown as a stop apparatus for cameras.
Figure 2:
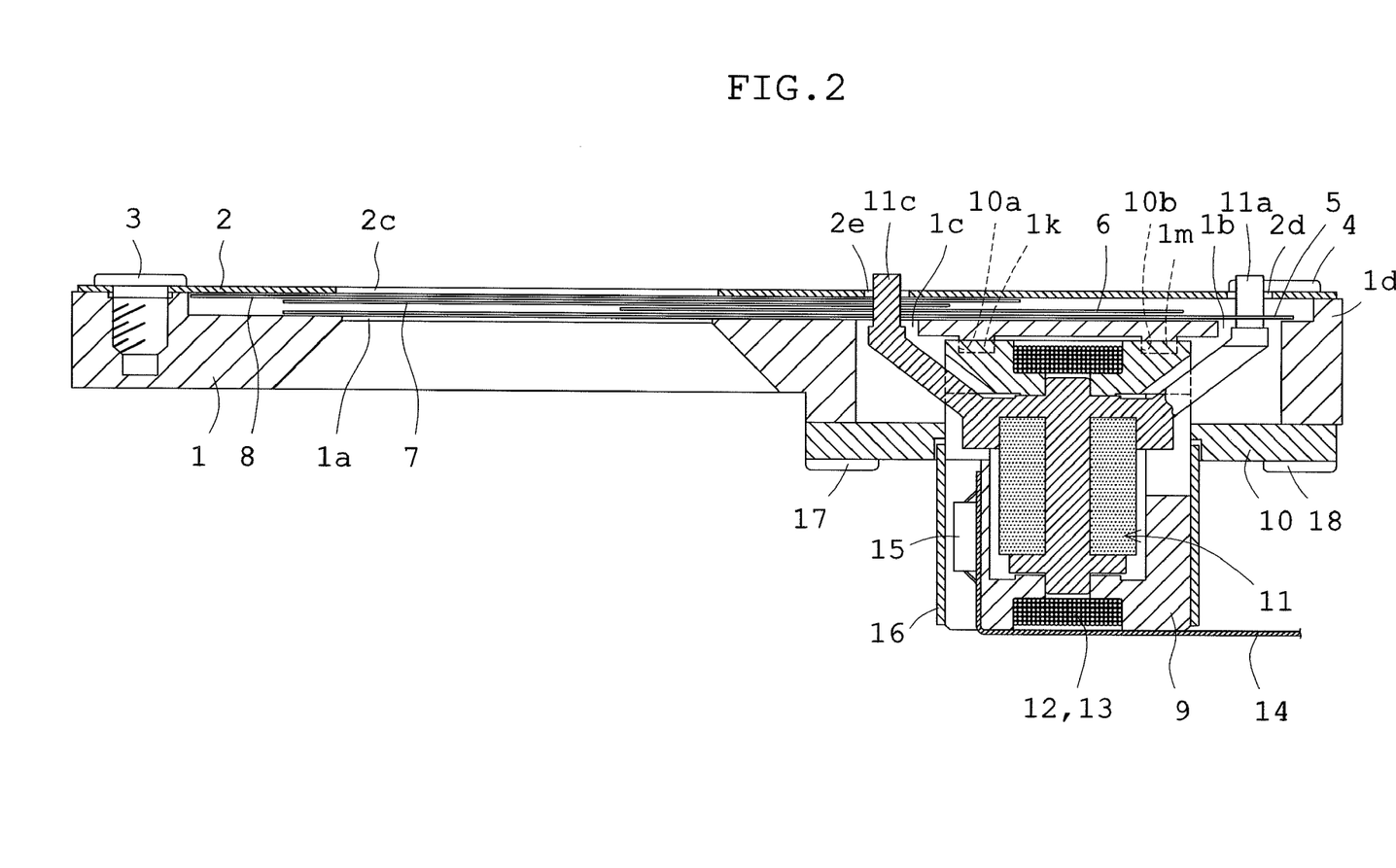
FIG. 2 is a sectional view of the embodiment shown in FIG. 1.
Figure 3:
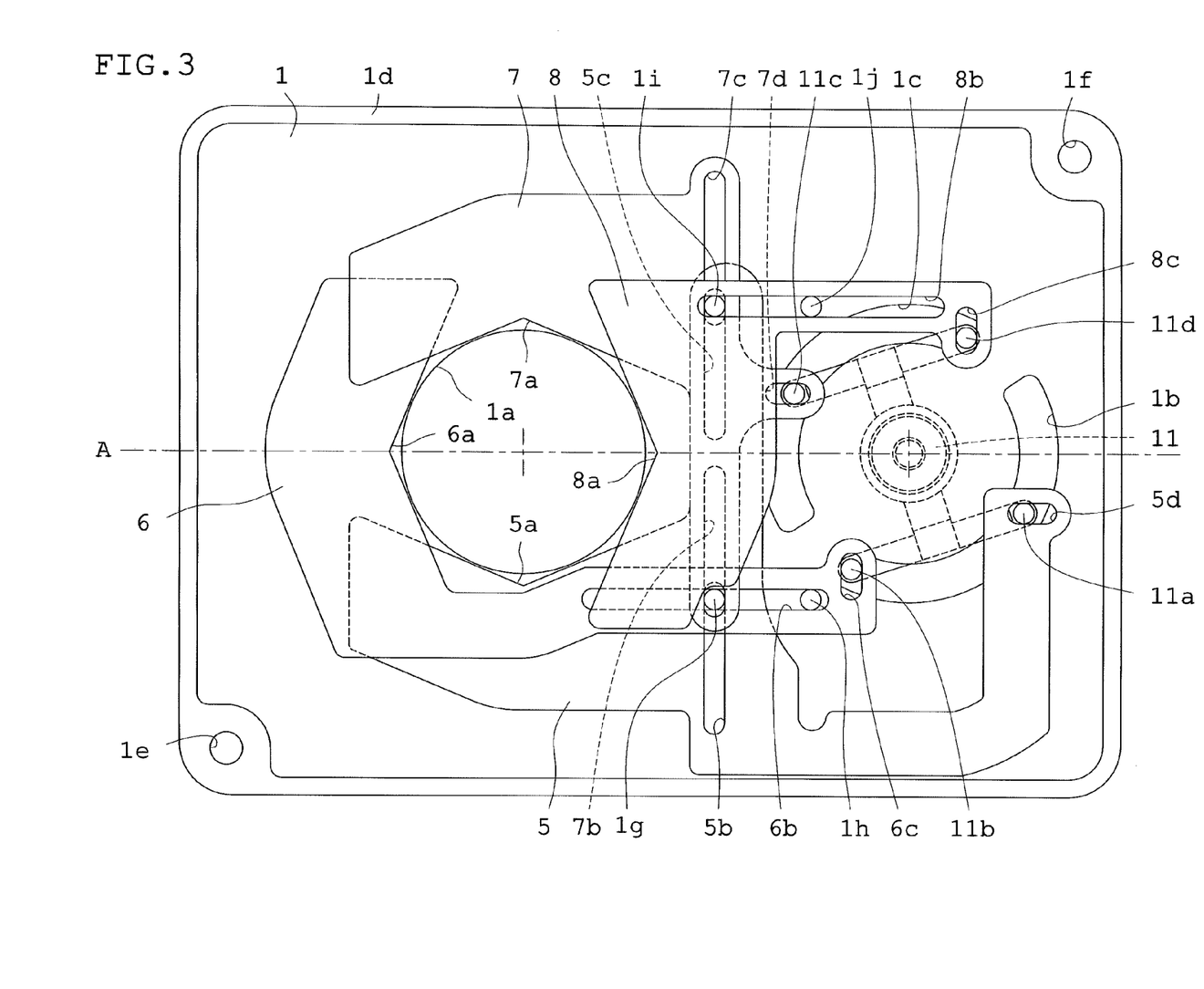
FIG. 3 is a plan view showing, by removing a cover plate, a state where the optical path aperture is fully opened by four blades (a controlled state of the maximum stop aperture) in the embodiment of FIG. 1.
Figure 4:
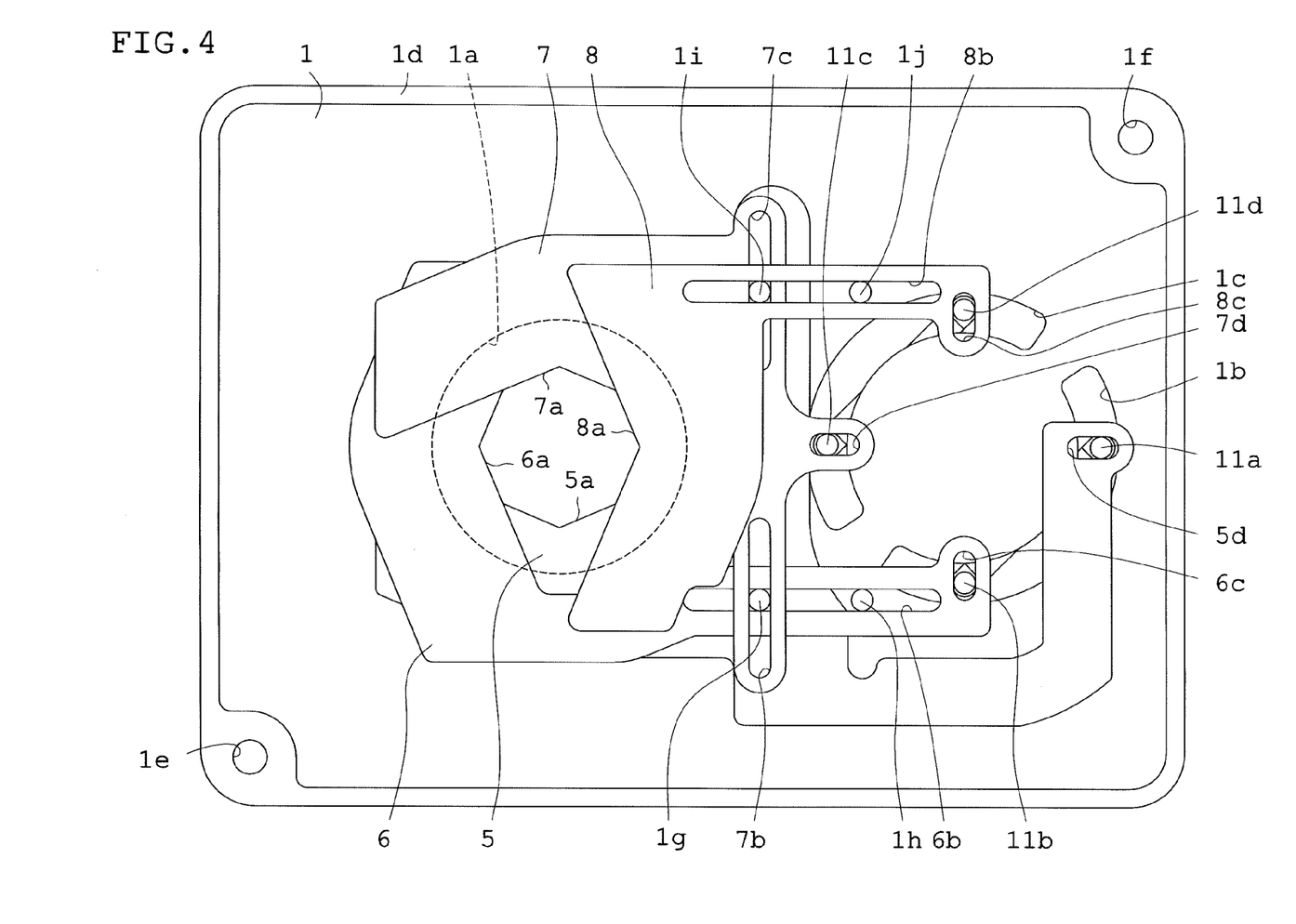
FIG. 4 is a plan view showing a controlled state of a moderate stop aperture in the same way as in FIG. 3.
Figure 5:
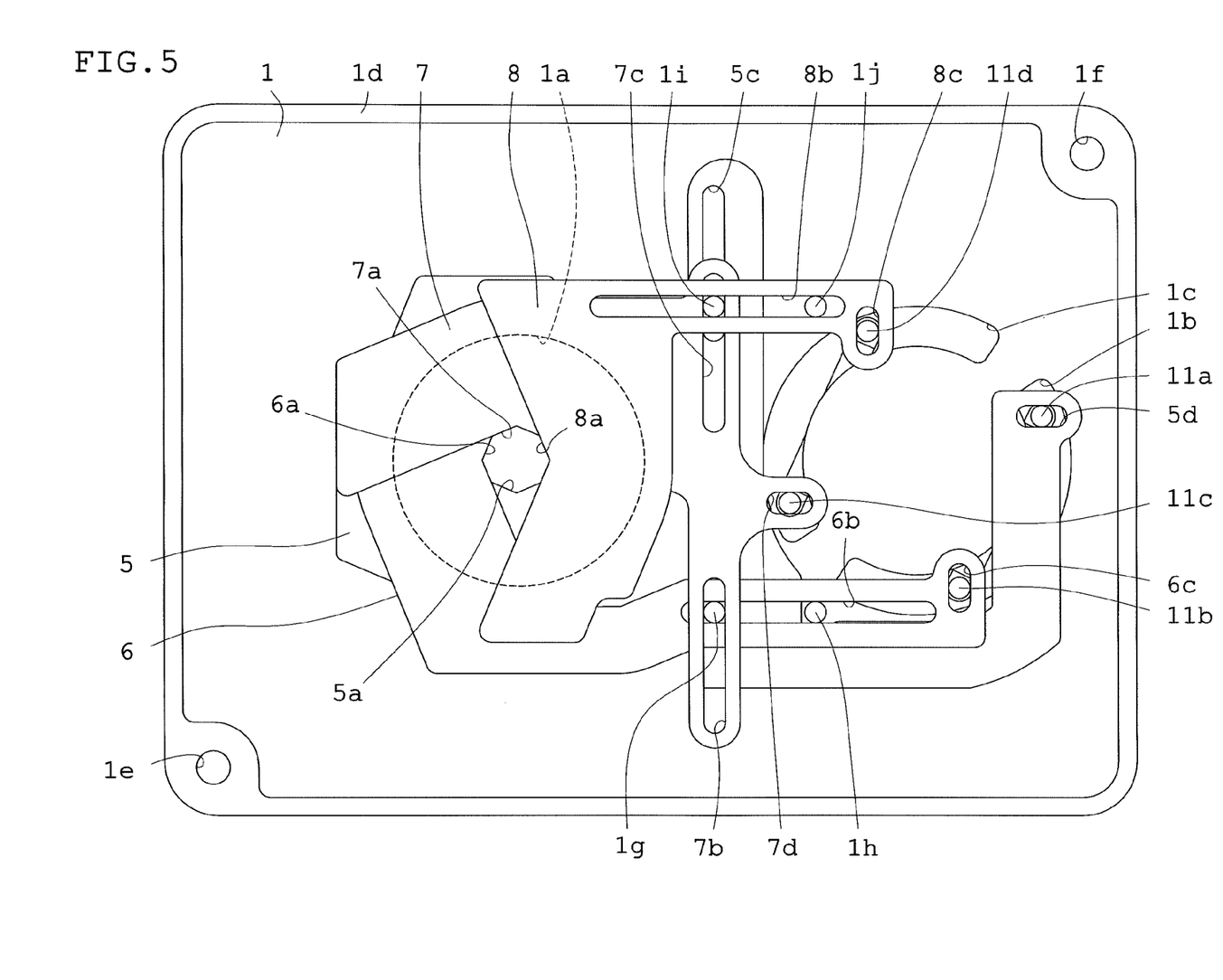
FIG. 5 is a plan view showing a controlled state of a small stop aperture in the same way as in FIG. 3.

This embodiment will be explained with reference to FIGS. 1-5. FIG. 1 is a perspective view showing main components of the embodiment which are exploded and FIG. 2 is a sectional view for chiefly explaining a mounting structure of an electromagnetic actuator used in the embodiment. FIGS. 3-5 are plan views showing a blade chamber in which a cover plate is removed to facilitate a comprehension of the blade chamber. FIG. 3 shows a state where the optical path aperture is fully opened by the four blades (a controlled state of the maximum stop aperture), FIG. 4 shows a controlled state of a moderate stop aperture, and FIG. 5 shows a controlled state of a small stop aperture.

First, chiefly using FIGS. 1 and 2, the structure of the embodiment will be described. A base plate 1 is a relatively thick member made of synthetic resin, which is practically rectangular in planar shape, and has a circular aperture 1a for a photographing optical path and two arcuate slots 1b and 1c provided on the same circumference. The base plate 1 is configured with a wall 1d on all sides along its periphery so that thick wall parts of the same height as the wall 1d are provided at two corners on one diagonal line and have screw holes 1e and 1f. Moreover, the base plate 1 is provided with four guide pins 1g, 1h, 1i, and 1j. The guide pins 1g and 1h and the guide pins 1i and 1j are arranged symmetrically about a line A connecting the center of the aperture 1a with the center of the circumference on which the two arcuate slots 1b and 1c are provided (a symmetry axis A connecting the rotary axis of the rotor 11 with the center of the aperture 1a in FIG. 3). In the embodiment, a line connecting the four guide pins 1g, 1h, 1i, and 1j forms a rectangle, but in the case where a space between the aperture 1a and the circumference provided with the slots 1b and 1c is made wider, the apparatus may be designed so that the line forms a square.

A cover plate 2 is a thin member made of synthetic resin of almost the same planar shape as in the base plate 1 and is mounted to the base plate 1 by screws 3 and 4 in such a way that holes 2a and 2b provided at two corners on one diagonal line are aligned with the screw holes 1e and 1f, respectively, in order to interpose a blade chamber between the base plate 1 and the cover plate 2. The cover plate 2 is provided with a circular aperture 2c somewhat larger than the aperture 1a at a position opposite to the aperture 1a and has slots 2d and 2e of identical shapes at positions opposite to the arcuate slots 1b and 1c. In addition, the cover plate 2 is provided with four holes 2f, 2g, 2h, and 2i, into which the tops of the guide pins 1g, 1h, 1i, and 1j are fitted.

In the blade chamber, four blades 5, 6, 7, and 8 are arranged in this order from the base-plate-1 side. Of these blades, the blade 5 located at the most base-plate-1-side position has an aperture forming edge 5a configured so that two linear edge ends have an open angle of 135° and three slots 5b, 5c, and 5d.

Of these, the slots 5b and 5c are provided so that their longitudinal directions are perpendicular to that of the slot 5d and are fitted to the guide pins 1g and 1i, respectively. The blade 6 located at the second position from the base-plate-1 side has an aperture forming edge 6a configured so that two linear edge ends have an open angle of 135° and two slots 6b and 6c, of which the slot 6b is parallel to the slot 5d of the blade 5, is provided so that its longitudinal direction is perpendicular to that of the slot 6c, and is fitted to both the guide pins 1g and 1h.

The blade 7 located at the third position from the base-plate-1 side has an aperture forming edge 7a configured so that two linear edge ends have an open angle of 135° and three slots 7b, 7c, and 7d. Of these, the slots 7b and 7c are provided so that their longitudinal directions are perpendicular to those of the slots 5d and 7d and, like the slots 5b and 5c of the blade 5, are fitted to the guide pins 1g and 1i, respectively. The blade 8 located at the most cover-plate-2-side position has an aperture forming edge 8a configured so that two linear edge ends have an open angle of 135° and two slots 8b and 8c, of which the slot 8b is parallel to the slot 7d of the blade 7, is provided so that its longitudinal direction is perpendicular to that of the slot 8c, and is fitted to both the guide pins 1i and 1j.

In the case of the embodiment, the four blades 5, 6, 7, and 8 are constructed as mentioned above, but the slots fitted to the four guide pins 1g, 1h, 1i, and 1j, as seen from the following operational description, may be constructed as described below.

First, the two slots 5b and 5c provided to the blade 5 may be configured as one slot fitted to both the guide pins 1g and 1i. In the case where a space between the aperture 1a and the arcuate slot 1c is widened so that the positions of the four guide pins 1g, 1h, 1i, and 1j are shifted to the aperture-1a side and the guide pins 1h and 1j are located on the aperture-1a side of the arcuate slot 1c, two slots provided parallel to the slots 5b and 5c, instead of the slots 5b and 5c, may be fitted to the guide pins 1h and 1j. The two slots in this case may be configured as a single slot fitted to both the guide pins 1h and 1j. In addition, the slot 5b, like the embodiment, is fitted to the guide pin 1g, but a slot provided parallel to the slot 5c, instead of the slot 5c, may be fitted to the guide pin 1i. Contrary to this, the slot 5c, like the embodiment, is fitted to the guide pin 1i, but a slot provided parallel to the slot 5b, instead of the slot 5b, may be fitted to the guide pin 1h. The same holds for the case of the blade 7.

On the other hand, the blade 6 of the embodiment, as described above, has the slot 6b fitted to both the guide pins 1g and 1h, but when the blade may be enlarged for design convenience, another slot parallel to the slot 6b may be provided so that this slot is fitted to both the guide pins 1i and 1j. The same holds for the case of the blade 8.

Subsequently, reference is made to the structure of the electromagnetic actuator mounted to the surface of the base plate 1 outside the blade chamber. The electromagnetic actuator of the embodiment, although different in the structure of the rotor, has the structure fundamentally similar to that of a well-known current-controlled motor set forth in Japanese Patent Kokai No. 2004-93874, for instance. In FIG. 2, a first stator frame 9 is configured into a cup-like shape to construct the housing chamber of a rotor 11 between the first stator frame 9 and a second stator frame 10. The rotor 11 having a permanent magnet is journaled by both the stator frames 9 and 10 in the housing chamber. Outside the stator frames 9 and 10, a groove is configured in such a way as to surround journals and two coils 12 and 13 (which is not shown in a separated state in FIG. 2) are wound around the groove so that the two stator frames 9 and 10 are mounted to each other.

A Hall element 15 as a magnetic sensing detection element, mounted to a flexible printed circuit board 14 is located outside the first stator frame 9 at a place where the groove is not provided, and a cylindrical yoke 16 is fitted outside the Hall element 15 and the coils 12 and 13. In the rotor 11, a rotor shaft is made of synthetic resin and arms constructed integrally with the rotor shaft to extend from the housing chamber along the radial direction, as illustrated in FIG. 1, is configured with four output pins 11a, 11b, 11c, and 11d. Also, the embodiment is provided with the two coils 12 and 13 and the Hall element 15, but as is well known, cases occur in which a single coil is required, and when the apparatus of the embodiment is used as a simple shutter apparatus having no stop function, the Hall element 15 becomes unnecessary.

The motor of the embodiment constructed as mentioned above is mounted to the base plate 1 through two screws 17 and 18 in such a way that two positioning holes 10a and 10b provided to the second stator frame 10 are fitted to two positioning pins 1k and 1m configured on the base plate 1. In this mounted state, the two output pins 11a and 11b are inserted in the blade chamber through the arcuate slot 1b and are fitted into the slots 5d and 6c of the blades 5 and 6 in the blade chamber so that their tops are inserted in the arcuate slot 2d of the cover plate 2. The remaining two output pins 11c and 11d are inserted in the blade chamber through the arcuate slot 1c and are fitted into the slots 7d and 8c of the blades 7 and 8 so that their tops are inserted in the arcuate slot 2e of the cover plate 2. Thus, in this mounted state, when the base plate 1 is viewed from above, the rotary axis of the rotor 11 is located at the center of the circumference on which the two arcuate slots 1b and 1c are provided.

Also, the electromagnetic actuator of the embodiment is the current-controlled motor constructed as mentioned above, but as is well known, such current-controlled motors have other various stator structures. As such, the electromagnetic actuator of the present invention is not limited to the structure of the embodiment. In the electromagnetic actuator of the present invention, any actuator that the four output pins are constructed integrally with the rotator is satisfactory, and the actuator of such a structure may be a step motor.

Subsequently, a description is given of the operation of the embodiment. FIG. 3 shows a state where the power switch of the camera is turned off. The coils 12 and 13, therefore, are not energized. At this time, the blade 5 is located at the most downward position by the output pin 11a, the blade 6 is located at the most leftward position by the output pin 11b, the blade 7 is located at the most upward position by the output pin 11c, and the blade 8 is located at the most rightward position by the output pin 11d. Consequently, the aperture forming edges 5a, 6a, 7a, and 8a of the blades 5, 6. 7, and 8 do not advance into the aperture 1a, and the size of the optical path of the object is regulated by the aperture 1a of a circular shape. The rotor 11 is constructed so that it cannot be further rotated in a clockwise direction by a stopper, not shown. Hence, this state shows, at the same time, a controlled state of the maximum aperture diameter of the aperture 1a.

The electromagnetic actuator of the embodiment is such that when an electric current is supplied from a motor driving circuit to the coil 12, a counterclockwise turning effort according to its current value is exerted to the rotor 11, and when the electric current is supplied to the other coil 13, a clockwise turning effect according to the current value is exerted to the rotor 11. Consequently, the rotor 11 is rotated in either direction according to the difference between these turning efforts, but when it is detected by the Hall element that the rotor 11 reaches a turning position according to the measured result of a photometric circuit, their turning efforts are balanced so that the rotor 11 is stopped.

In such a state of FIG. 3, when the power switch of the camera is turned on, the electric current is supplied to the two coils 12 and 13 in accordance with the measured result of the photometric circuit. When light from the object is considerably dark, the rotor 11 remains in a state of FIG. 3 and is not rotated. Hence, when photography is started in this state, it is performed with the maximum stop diameter. When the light from the object becomes bright in photography, the electric current supplied from the motor driving circuit to the coil 12 is relatively stronger than the electric current supplied to the coil 13 and the rotor is rotated in a counterclockwise direction. Whereby, the two blades 5 and 7 are actuated in directions opposite to each other to make the aperture forming edges 5a and 7a advance in the aperture 1a, while the remaining two blades 6 and 8 are also actuated in directions opposite to each other to make the aperture forming edges 6a and 8a advance in the aperture 1a. As a result, the stop aperture formed in the aperture 1a by the four aperture forming edges 5a, 7a, 6a, and 8a is shaped into a regular octagon.

When the size of the stop aperture, namely the stop diameter is diminished in this way and the stop diameter corresponding to the light from the object is obtained, a preset turning position of the rotor 11 is detected by the Hall element 15 and thereby the turning efforts in both directions are balanced so that the rotor 11 is stopped. In this way, even in the operation subsequent to the above description, the rotor 11 is rotated in the clockwise or counterclockwise direction according to a change of the light from the object and thereby the stop diameter is changed. FIG. 4 shows a controlled state of a moderate stop aperture, of the stop apertures continuously changed as mentioned above, and FIG. 5 shows a controlled state of a small stop (the minimum stop) aperture. In the embodiment, as seen from these states, the shape of the stop aperture formed by the cooperation of the aperture forming edges 5a, 7a, 6a, and 8a of the four blades 5, 7, 6, and 8 always has the similar figure of the regular octagon.

Also, the embodiment has the structure that the size of the stop aperture can be continuously changed and thus in the above description, the explanation has been made on the premise that stop apertures in countless numbers can be obtained in actual photography as well. The present invention, however, is not limited to such a case and may be modified so that, for example, only stop diameters according to five steps are obtained, depending on the design specification of the control circuit. In the case of the embodiment, each of the aperture forming edges 5a, 6a, 7a, and 8a of the individual blades has the shape opened by 135° toward the blade actuated in the opposite direction, and hence the stop aperture formed by the cooperation of these blades assumes the shape of the regular octagon. However, the embodiment may be modified so that the aperture forming edge of each blade is configured into a linear shape and is made parallel to the aperture forming edge of the blade actuated in the opposite direction and the stop aperture formed by the cooperation of the four blades has the shape of a square. However, it is needless to say that the structure made like the embodiment, because of its aperture shape closer to the circle, is rather favorable.

After photography is performed as mentioned above, when the power switch of the camera is turned off without performing further photography, a delay circuit is actuated so that the electric current is supplied only to the coil 13 from the motor driving circuit, and thus the rotor 11 is rotated in the clockwise direction, and after being restored to the state shown in FIG. 3, is stopped.

Also, in the above discussion, reference has been made to the case where when the power switch of the camera is turned off, the apparatus of the embodiment is in a state of FIG. 3. However, it is needless to say that, contrary to this, the embodiment may be designed to be in a state of FIG. 5. Although the embodiment has been described as the stop apparatus for movie cameras, it is needless to say that the embodiment can also be used as the stop apparatus for projectors, the stop apparatus for microscopes, or the stop apparatus for illumination instruments. Additionally, in photography, when the embodiment is designed so that exposure time is controlled by the shutter apparatus immediately after the apparatus of the embodiment reaches, for example, a state of FIG. 4 from a state of FIG. 3 and the rotor 11 is stopped, the apparatus of the embodiment can be used as the stop apparatus for still cameras. In the case where the apparatus is used as the stop apparatus for still cameras so that, for example, only one stop aperture such as that shown in FIG. 4 is obtained, there is no need to provide the Hall element 15 and it is only necessary to provide a stopper for stopping the rotation of the rotor 11 at the position of FIG. 4. In such a case, the Hall element 15 is unnecessary and the coils 12 and 13 may be replaced with a single coil so that when the rotor 11 is reversed in rotation, the direction of current supply is switched.

Figure 6:
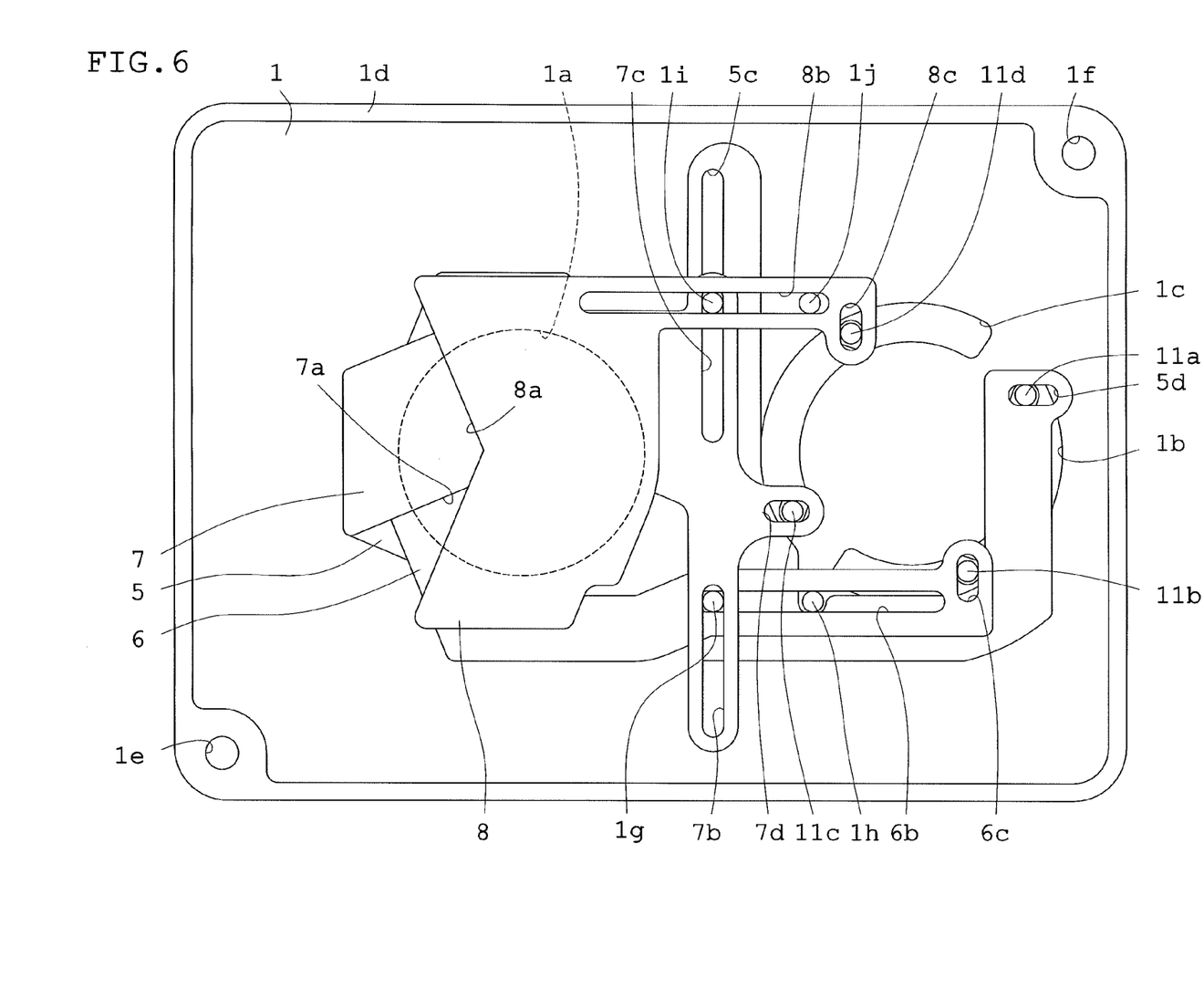
FIG. 6 is a plan view showing a state where the optical path aperture is closed by the four blades, in the same way as in FIG. 3, in the embodiment of the present invention shown as a shutter apparatus for cameras.

In the discussion so far, reference has been made to the case where the blade actuating apparatus for optical instruments of the present invention is used as various stop apparatuses, but it is possible that the blade actuating apparatus for optical instruments of the present invention is also used as the shutter apparatus for still cameras. Thus, this matter is briefly described below. Of the shutter apparatuses, as is well known, those in which a plurality of blades has a stop function as well and those in which operation is simply performed between a fully opened blade position and a closed blade position are available. Thus, in the former case, when the apparatus of the embodiment is adopted in the digital camera, it is only necessary that in photography, an exposure time control circuit is actuated immediately after the rotor 11 is stopped, for example, in the state of FIG. 4 from the state of FIG. 3 so that after preset time passes, as shown in FIG. 6, the aperture 1a is closed by the four blades 5, 6, 7, and 8. Subsequently, after image information is transferred from a solid-state image sensor to a memory, the apparatus is restored to the state of FIG. 3. In the latter case, when the apparatus is adopted in the digital camera, the exposure time control circuit is actuated in the state of FIG. 3 in photography and after the preset time passes, the apparatus is brought to a state shown in FIG. 6 so that the image information is transferred to the memory and then the apparatus is restored to the state of FIG. 3. In this case, therefore, the Hall element 15 is unnecessary and it is only necessary that the coils 12 and 13 is replaced with a single coil so that when the rotor 11 is reversed in rotation, the direction of current supply is switched.

In the former case, when the apparatus is adopted in a film camera, it is only necessary that the apparatus is brought to the state of FIG. 6 before photography so that it is brought, for example, to the state of FIG. 4 from the state of FIG. 6 in photography and then is restored to the state of FIG. 6. In the latter case, when the apparatus is adopted in the film camera, it is only necessary that the apparatus is brought to the state of FIG. 6 before photography so that it is brought to the state of FIG. 3 from the state of FIG. 6 in photography and then is restored to the state of FIG. 6. In this case, therefore, the Hall element 15 is unnecessary and it is only necessary that the coils 12 and 13 is replaced with a single coil so that when the rotor 11 is reversed in rotation, the direction of current supply is switched. When the apparatus is constructed in this way, it is needless to say that the apparatus can be used not as the shutter apparatus, but as the lens barrier apparatus.

What is claimed is:

1. A blade actuating apparatus for optical instruments, comprising:
    a base plate which has a circular optical path aperture to construct a blade chamber between the base plate and a cover plate and is provided with four guide pins at positions where segments connecting the four guide pins form a square on a blade chamber side surface of the base plate;
    an electromagnetic actuator which is provided with a rotor having a permanent magnet and is mounted to the base plate in such a way that the four guide pins provided between a rotary axis of the rotor and a center of the aperture are arranged, two on each side of a line connecting the rotary axis and the center as a symmetry axis, to make four output pins provided integrally with the rotor at preset angular intervals in radial directions to project into the blade chamber;
    a first blade and a second blade, each having an aperture forming edge, a first slot, and a second slot, so that in the first blade, the first slot provided parallel to the symmetry axis is fitted to two guide pins located on one side of the symmetry axis, while in the second blade, the first slot provided parallel to the symmetry axis is fitted to two guide pins located on a remaining side of the symmetry axis, and so that the second slot of the first blade and the second slot of the second blade are fitted to a first output pin and a second output pin, respectively, of the four output pins and thereby a reciprocating operation is performed parallel to the symmetry axis in directions opposite to each other by a reciprocating rotation of the rotor; and
    a third blade and a fourth blade, each having an aperture forming edge, a first slot, and a second slot, so that the first slot of each of the first blade and the second blade is fitted to one of the guide pins located on each side of the symmetry axis and so that the second slot of the third blade and the second slot of the fourth blade are fitted to a third output pin and a fourth output pin, respectively, of the four output pins and thereby the reciprocating operation is performed perpendicular to the symmetry axis in directions opposite to each other by the reciprocating rotation of the rotor,
    the four blades being actuated by the rotation of the rotor so that a size of the optical path aperture is changed into a similar figure by cooperation of aperture forming edges of the four blades.

2. A blade actuating apparatus for optical instruments according to claim 1, wherein the four output pins are provided at angular intervals of 90° with respect to the rotor so that the first output pin and the second output pin are provided at angular intervals of 180° and the third output pin and the fourth output pin are also provided at angular intervals of 180°.

3. A blade actuating apparatus for optical instruments according to claim 1, wherein the second slot of the first blade and the second slot of the second blade are provided perpendicular to the symmetry axis and the second slot of the third blade and the second slot of the fourth blade are provided parallel to the symmetry axis.

4. A blade actuating apparatus for optical instruments according to claim 1, wherein at least one of the first slot of the third blade and the first slot of the fourth blade includes two slots so that one of the two slots is fitted to one of the two guide pins located on one side of the symmetry axis and a remaining slot is fitted to one of the two guide pins located on the remaining side of the symmetry axis.

5. A blade actuating apparatus for optical instruments according to claim 1, wherein each of the aperture forming edges provided on the four blades includes two edge ends configured to open about 135° toward a blade actuated in an opposite direction so that the optical path aperture formed by the edge ends of the four blades is shaped into an octagon.

6. A blade actuating apparatus for optical instruments according to claim 1, wherein the electromagnetic actuator is a motor in which the rotor is reciprocated and rotated only within a preset angle in accordance with a direction in which a coil of a stator is energized, and the stator is provided with a magnetic sensing detection element detecting a rotation angle position of the rotor.

7. A blade actuating apparatus for optical instruments according to claim 2, wherein the second slot of the first blade and the second slot of the second blade are provided perpendicular to the symmetry axis and the second slot of the third blade and the second slot of the fourth blade are provided parallel to the symmetry axis.

8. A blade actuating apparatus for optical instruments according to claim 2, wherein at least one of the first slot of the third blade and the first slot of the fourth blade includes two slots so that one of the two slots is fitted to one of the two guide pins located on one side of the symmetry axis and a remaining slot is fitted to one of the two guide pins located on the remaining side of the symmetry axis.

9. A blade actuating apparatus for optical instruments according to claim 2, wherein each of the aperture forming edges provided on the four blades includes two edge ends configured to open about 135° toward a blade actuated in an opposite direction so that the optical path aperture formed by the edge ends of the four blades is shaped into an octagon.

10. A blade actuating apparatus for optical instruments according to claim 2, wherein the electromagnetic actuator is a motor in which the rotor is reciprocated and rotated only within a preset angle in accordance with a direction in which a coil of a stator is energized, and the stator is provided with a magnetic sensing detection element detecting a rotation angle position of the rotor.

* * * * *